United States Patent
Mura et al.

(10) Patent No.: US 10,207,342 B2
(45) Date of Patent: Feb. 19, 2019

(54) INDEXABLE ROTARY CUTTING TOOL AND INSERT USED THEREIN

(71) Applicant: Mitsubishi Hitachi Tool Engineering, Ltd., Sumida-ku, Tokyo (JP)

(72) Inventors: Hisanori Mura, Narita (JP); Tadahiro Hibata, Narita (JP); Tomohiro Murata, Narita (JP)

(73) Assignee: Mitsubishi Hitachi Tool Engineering, Ltd., Tokyo (JP)

( * ) Notice: Subject to any disclaimer, the term of this patent is extended or adjusted under 35 U.S.C. 154(b) by 326 days.

(21) Appl. No.: 14/917,838

(22) PCT Filed: Sep. 10, 2014

(86) PCT No.: PCT/JP2014/073929
§ 371 (c)(1),
(2) Date: Mar. 9, 2016

(87) PCT Pub. No.: WO2015/037617
PCT Pub. Date: Mar. 19, 2015

(65) Prior Publication Data
US 2016/0214186 A1    Jul. 28, 2016

(30) Foreign Application Priority Data
Sep. 11, 2013    (JP) .................................. 2013-188271

(51) Int. Cl.
B23C 5/20    (2006.01)
B23C 5/10    (2006.01)

(52) U.S. Cl.
CPC ............. *B23C 5/207* (2013.01); *B23C 5/109* (2013.01); *B23C 2200/0433* (2013.01);
(Continued)

(58) Field of Classification Search
CPC . B23C 5/109; B23C 5/2221; B23C 2200/086; B23C 2200/125;
(Continued)

(56) References Cited

U.S. PATENT DOCUMENTS

| | | |
|---|---|---|
| 4,699,549 A | 10/1987 | Shimomura et al. |
| 5,052,863 A | 10/1991 | Satran |

(Continued)

FOREIGN PATENT DOCUMENTS

| | | |
|---|---|---|
| EP | 0 392 730 A2 | 10/1990 |
| EP | 0 925 863 A2 | 6/1999 |

(Continued)

OTHER PUBLICATIONS

International Search Report for PCT/JP2014/073929 dated Dec. 16, 2014 [PCT/ISA/210].
(Continued)

*Primary Examiner* — Sara Addisu
(74) *Attorney, Agent, or Firm* — Sughrue Mion, PLLC

(57) ABSTRACT

An insert detachably attached to an indexable rotary cutting tool, having an upper surface having cutting edges along the ridgeline, a lower surface, side surfaces, and a center hole for a fastening screw; each cutting edge having a corner cutting edge formed in each acute corner portion, and a bottom cutting edge and a peripheral cutting edge formed along the ridgelines on both sides of the corner cutting edge; the bottom cutting edge and the peripheral cutting edge having different clearance angles; a flank of the corner cutting edge having an angle-changing surface portion having a clearance angle continuously changing in a region from the bottom cutting edge to the peripheral cutting edge; and the length of the peripheral cutting edge being restricted by a receding portion adjacent to an upper end of the peripheral cutting edge.

15 Claims, 14 Drawing Sheets

(52) U.S. Cl.
CPC ............. *B23C 2200/0477* (2013.01); *B23C 2200/085* (2013.01); *B23C 2200/086* (2013.01); *B23C 2200/125* (2013.01); *B23C 2200/243* (2013.01); *B23C 2200/283* (2013.01); *B23C 2200/286* (2013.01)

(58) Field of Classification Search
CPC ........ B23C 2200/283; B23C 2200/286; B23C 2200/0433; B23C 2200/085; B23C 2200/243; B23C 5/207; B23C 2200/0477
See application file for complete search history.

(56) References Cited

U.S. PATENT DOCUMENTS

| | | | |
|---|---|---|---|
| 5,071,292 A | | 12/1991 | Satran |
| 5,593,255 A | | 1/1997 | Satran et al. |
| 5,863,156 A | | 1/1999 | Satran et al. |
| 5,893,683 A | * | 4/1999 | Johnson ................ B23C 5/109 407/113 |
| 5,947,650 A | | 9/1999 | Satran et al. |
| 6,053,672 A | | 4/2000 | Satran et al. |
| 6,196,770 B1 | * | 3/2001 | Astrom ................ B23C 5/109 407/114 |
| 6,540,447 B2 | | 4/2003 | Nagata et al. |
| 6,851,897 B2 | | 2/2005 | Kubo |
| 7,090,444 B1 | * | 8/2006 | Craig ................ B23C 5/207 407/113 |
| 8,926,234 B2 | | 1/2015 | Engstrom |
| D752,664 S | * | 3/2016 | Jung ................ D15/139 |
| 9,776,258 B2 | * | 10/2017 | Brunetto ................ B23C 5/207 |
| 9,776,259 B2 | * | 10/2017 | Saji ................ B23C 5/207 |
| 2001/0051077 A1 | | 12/2001 | Nagata et al. |
| 2003/0170079 A1 | * | 9/2003 | Daiguji ................ B23C 5/006 407/34 |
| 2003/0180103 A1 | * | 9/2003 | Nagaya ................ B23C 5/207 407/34 |
| 2004/0005199 A1 | * | 1/2004 | Janness ................ B23B 51/048 407/35 |
| 2004/0081522 A1 | | 4/2004 | Kubo |
| 2008/0170919 A1 | | 7/2008 | Dufour et al. |
| 2008/0304924 A1 | | 12/2008 | Engstrom et al. |
| 2009/0279962 A1 | * | 11/2009 | Dufour ................ B23C 5/207 407/37 |
| 2009/0311057 A1 | * | 12/2009 | Yoshida ................ B23C 5/109 407/113 |
| 2011/0008113 A1 | * | 1/2011 | Abe ................ B23C 5/109 407/42 |
| 2011/0058909 A1 | * | 3/2011 | Matsuzawa ........... B23B 51/048 407/119 |
| 2011/0236143 A1 | * | 9/2011 | Ryu ................ B23C 5/2221 407/103 |
| 2012/0009029 A1 | * | 1/2012 | Saji ................ B23C 5/109 407/67 |
| 2013/0101363 A1 | * | 4/2013 | Yoshioka ................ B23C 5/109 407/42 |
| 2014/0212227 A1 | * | 7/2014 | Bitner ................ B23C 5/207 407/40 |
| 2014/0314509 A1 | | 10/2014 | Yamamichi |
| 2015/0139743 A1 | * | 5/2015 | Ballas ................ B23C 5/109 407/48 |
| 2016/0023285 A1 | * | 1/2016 | Saji ................ B23C 5/207 407/33 |
| 2017/0008099 A1 | * | 1/2017 | Touma ................ B23C 5/109 |
| 2017/0157685 A1 | * | 6/2017 | Mao ................ B23C 5/2213 |
| 2017/0291231 A1 | * | 10/2017 | Mao ................ B23C 5/207 |
| 2017/0297120 A1 | * | 10/2017 | Fang ................ B23C 5/2247 |
| 2017/0368615 A1 | * | 12/2017 | Yamamoto ............ B23C 5/207 |
| 2018/0015554 A1 | * | 1/2018 | Roman ................ B23C 5/207 |

FOREIGN PATENT DOCUMENTS

| | | | | |
|---|---|---|---|---|
| JP | 08-066815 A | | 3/1996 | |
| JP | 08-071833 A | | 3/1996 | |
| JP | 08-118135 A | | 5/1996 | |
| JP | 11-179611 A | | 7/1999 | |
| JP | 11179611 A | * | 7/1999 | ........ B23C 5/2221 |
| JP | 11-513315 A | | 11/1999 | |
| JP | 2002-046010 A | | 2/2002 | |
| JP | 2003-019617 A | | 1/2003 | |
| JP | 2008-105121 A | | 5/2008 | |
| JP | 2008-302493 A | | 12/2008 | |
| JP | 2009178787 A | * | 8/2009 | |
| JP | 2012210708 A | * | 11/2012 | ........ B23C 5/109 |
| JP | 2014198375 A | * | 10/2014 | ........ B23C 5/207 |
| JP | 2015027707 A | * | 2/2015 | ........ B23C 5/207 |
| JP | 2016163911 A | * | 9/2016 | ........ B23C 5/109 |
| WO | 2013/065347 A1 | | 5/2013 | |

OTHER PUBLICATIONS

Communication dated Mar. 16, 2017, from the European Patent Office in counterpart European application No. 14843905.2.

* cited by examiner

Example 2
10 mm

Comparative Example 1
10 mm

Example 2     Peripheral Cutting Edge    Normal Wear
0.3 mm

INDEXABLE ROTARY CUTTING TOOL AND INSERT USED THEREIN

CROSS REFERENCE TO RELATED APPLICATIONS

This application is a National Stage of International Application No. PCT/JP2014/073929 filed Sep. 10, 2014 (claiming priority based on Japanese Patent Application No. 2013-188271 filed Sep. 11, 2013), the contents of which are incorporated herein by reference in their entirety.

FIELD OF THE INVENTION

The present invention relates to an indexable rotary cutting tool capable of cutting a work with a good finished surface condition, and an insert used therein.

BACKGROUND OF THE INVENTION

An indexable rotary cutting tool having pluralities of inserts each having cutting edges detachably attached to a tool holder can cut a work with high efficiency. However, when an indexable rotary cutting tool comprising small inserts is used for accurate finishing, chipping and breakage are likely to occur in cutting edges because of insufficient rigidity to stress generated by cutting. Chipping and breakage not only reduce the life of cutting edges, but also deteriorate finished surface quality. Accordingly, various inserts having such shapes as to avoid the chipping and breakage of cutting edges have been proposed.

One means for preventing chipping and breakage is to reduce the vibration of cutting edges. An insert for a cutting tool using such means is disclosed in JP 2003-19617 A. As shown in FIGS. 24(a) and 24(b), this cutting tool insert 201 has a substantially polygonal plate shape comprising a seat-contacting surface 211, an upper surface 212 having a rake face 221A, and flanks 213 between the upper surface 212 and the seat-contacting surface 211; a main cutting edge 216A extending from one corner cutting edge 214A comprising a first main cutting edge 217A, and a second main cutting edge 218A connected to the first main cutting edge 217A with an obtuse angle α; the first main cutting edge 217A being inclined toward the seat-contacting surface 211 with an obtuse angle β to the second main cutting edge 218A; and the first main cutting edge 217A being shorter than the second main cutting edge 218A; the flank 213 comprising a first flank 223A and a second flank 224A; an auxiliary cutting edge 219A extending from the corner cutting edge 214A on the opposite side to the main cutting edge 216A; and the auxiliary cutting edge 219A being connected to the ridgeline 228A with an obtuse angle θ. This shape provides a cutting edge with a large axial rake angle Ax to reduce cutting resistance, thereby reducing vibration. However, JP 2003-19617 A cannot sufficiently prevent chipping and breakage in the corner cutting edge 214A and the first main cutting edge 217A, because (a) a flank of the corner cutting edge 214A is not provided with an angle-changing surface portion having a clearance angle continuously changing along the corner cutting edge 214A, and because (b) the first main cutting edge 217A does not have a receding portion at its end.

JP 8-66815 A discloses, as shown in FIGS. 25(a) to 25(c), a cutting insert 303 for a rotary cutting tool, which comprises a pair of parallel main cutting edges 304a, 304b, a pair of auxiliary cutting edges 305a, 305b laterally extending relative to the main cutting edges 304a, 304b, corner cutting edges 306a, 306b each connecting each main cutting edge 304a, 304b to each auxiliary cutting edge 305a, 305b, rake faces 313, and flanks 321, 322, the cutting edge angle θ of each corner cutting edge 306a, 306b being 50-70°. When the cross-sectional view [FIG. 25(b)] of the main cutting edge is compared with the cross-sectional view [FIG. 25(c)] of the auxiliary cutting edge, the main cutting edge and the auxiliary cutting edge seem to have different clearance angles. However, JP 8-66815 A describes that the clearance angle is substantially constant along the cutting edge, failing to describe a technical idea of making the clearance angle of the auxiliary cutting edge (bottom edge) larger than that of the main cutting edge (peripheral cutting edge). Accordingly, the cutting insert 303 of JP 8-66815 A cannot improve the cutting performance of the peripheral cutting edge while preventing the chipping and breakage of the bottom cutting edge, failing to improve a finished surface condition of a work. Of course, JP 8-66815 A neither discloses nor suggests that the corner cutting edges 306a, 306b are provided with angle-changing surface portions each having a clearance angle continuously changing in a region from the bottom cutting edge to the peripheral cutting edge, to prevent the chipping and breakage of the corner cutting edges 306a, 306b.

OBJECT OF THE INVENTION

Accordingly, an object of the present invention is to provide an indexable rotary cutting tool having improved breakage resistance and wear resistance in cutting edges to improve finished surface conditions of a work, and an insert used therein, particularly an insert having improved cutting performance in peripheral cutting edges while preventing chipping and breakage in bottom cutting edges, thereby improving finished surface conditions of a work.

DISCLOSURE OF THE INVENTION

Thus, the insert of the present invention detachably attached to an indexable rotary cutting tool holder comprises an upper surface, a lower surface opposing the upper surface and coming into contact with a seat surface of the tool holder, side surfaces connecting the upper surface and the lower surface, a center hole penetrating the insert from the upper surface to the lower surface for receiving a fastening screw, and cutting edges formed along ridgelines between the upper surface and the side surfaces;

the insert being in a polygonal shape rotationally symmetric around a center axis P of the center hole, with acute corner portions;

each of the cutting edges being constituted by a corner cutting edge formed in each corner portion, and a bottom cutting edge and a peripheral cutting edge formed along ridgelines on both sides of the corner cutting edge;

the bottom cutting edge and the peripheral cutting edge having different clearance angles;

a flank of the corner cutting edge having an angle-changing surface portion having a clearance angle continuously changing in a region from the bottom cutting edge to the peripheral cutting edge; and a ridgeline of the upper surface extending from an upper end of the peripheral cutting edge being provided with a receding portion determining the length of the peripheral cutting edge.

The clearance angle of the bottom cutting edge is preferably larger than that of the peripheral cutting edge.

It is preferable that the clearance angle α of the bottom cutting edge is 6-12°, and the clearance angle β of the peripheral cutting edge is 3-11°, the clearance angle α being larger than the clearance angle β by 2° or more.

All of the bottom cutting edge, the corner cutting edge and the peripheral cutting edge are preferably connected to a flat rake face.

The length of the angle-changing surface portion along the corner cutting edge is preferably at least 80% of the entire length of the corner cutting edge.

The upper surface preferably comprises a first upper surface region having the center hole, and second upper surface regions each constituting the rake face, the rake face being lower than the first upper surface region and inclined downward from the corner cutting edge as an apex.

The cutting edge angle ε in each corner portion is preferably 80-90°.

The insert of the present invention preferably has a substantially parallelogramatic or equilateral-triangular shape.

When the insert of the present invention has a substantially parallelogramatic shape having a pair of parallel long sides and a pair of parallel short sides, the distance T1 between the long sides is preferably 4-6 mm, and the distance T2 between the short sides is preferably 6-10 mm. To the distance T1 between the long sides, the percentage of the length T3 of the bottom cutting edge is preferably 10-40%, the percentage of the length T4 of the peripheral cutting edge is preferably 25-50%, and the percentage of the radius Rc of the corner cutting edge is preferably 4-25%.

When the insert of the present invention has a substantially equilateral-triangular shape, the perpendicular distance T5 between one peripheral cutting edge and its farthest corner cutting edge is preferably 5-8 mm.

To the perpendicular distance T5, the percentage of the length T6 of the bottom cutting edge is preferably 10-35%, the percentage of the length of the peripheral cutting edge T7 is preferably 15-40%, and the percentage of the radius Rc of the corner cutting edge is preferably 2.5-20%.

The indexable rotary cutting tool of the present invention has the above inserts detachably attached to a tool holder, the bottom cutting edges and the corner cutting edges each having a negative radial rake angle, and the peripheral cutting edges each having a radial rake angle changing from negative to positive, the length of a region having a positive radial rake angle in the peripheral cutting edge being 50% or more of the entire length of the peripheral cutting edge.

The insert fixed to the tool holder preferably has the bottom cutting edge having a radial rake angle of −3° to −0.5°, and the peripheral cutting edge having a radial rake angle of −0.5° to +3°.

In the indexable rotary cutting tool of the present invention, the radial rake angle preferably linearly changes in a region from an inner end of the corner cutting edge to an upper end of the peripheral cutting edge.

The insert fixed to the tool holder preferably has a bottom cutting edge having a clearance angle in a range of 5-10°, and a peripheral cutting edge having a clearance angle in a range of 10-18°.

DESCRIPTION OF THE PREFERRED EMBODIMENTS

The embodiments of the present invention will be explained in detail below without intention of restriction, and various modifications may be made within the scope of the present invention. Unless otherwise mentioned, explanations of each embodiment are applicable to other embodiments.

Figure 1:
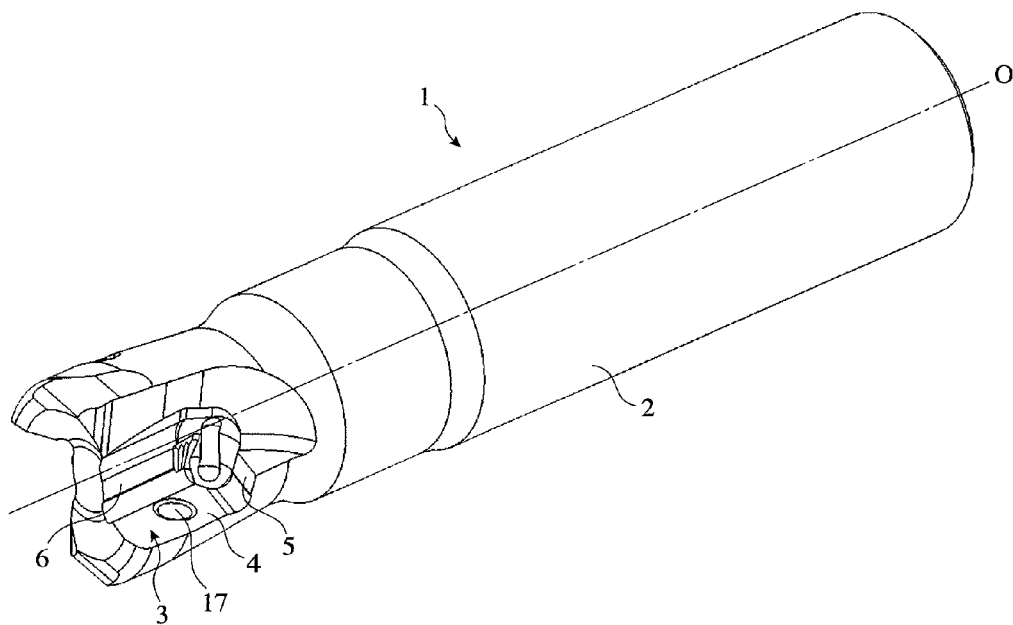
FIG. 1 is a perspective view showing an example of tool holders constituting the indexable rotary cutting tool of the present invention.

FIG. 1 shows an example of tool holders 2 for the indexable rotary cutting tool 1 of the present invention. This tool holder 2 comprises two insert seats 3 at symmetric positions around the rotation axis O in a tip end portion, each insert seat 3 having a flat seat surface 4 coming into contact with a lower surface of an insert 7, two rear wall surfaces 5 positioned rearward the seat surface 4 for constraining a short side surface of the insert 7, and a side wall surface 6 positioned on the side of the rotation axis O for constraining a long side surface of the insert 7. The seat surface 4 has a threaded hole 17 threadably engageable with a clamp screw 18 for detachably fixing the insert 7. Though the tool holder 2 shown in FIG. 1 has two insert seats 3, it may have three or more insert seats as long as it has enough strength.

[1] First embodiment (1) Insert

Figure 2:
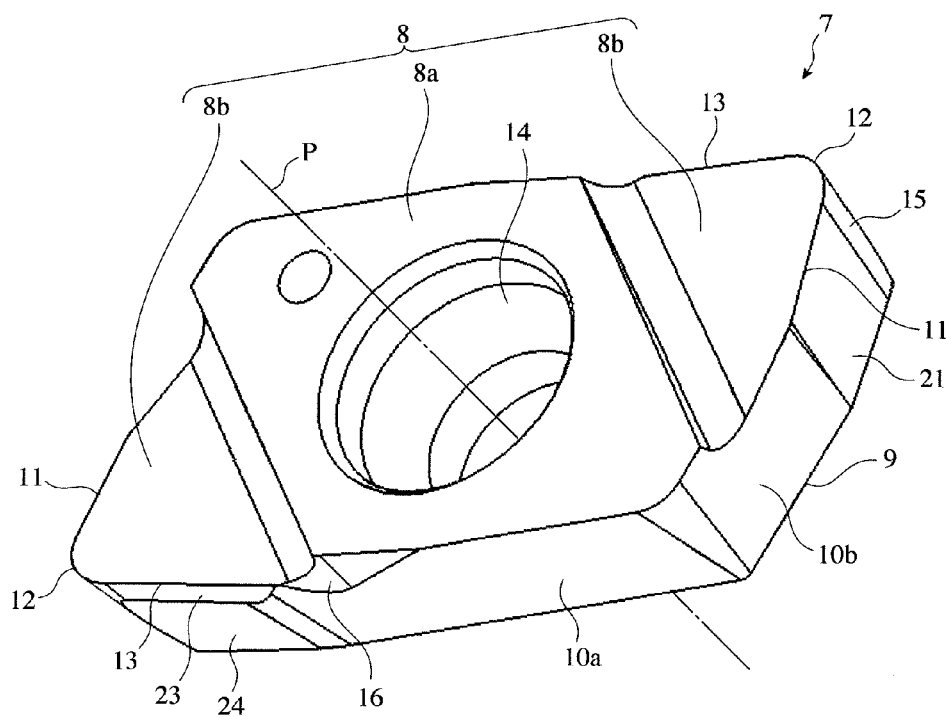
FIG. 2 is a perspective view showing an insert according to the first embodiment of the present invention.
Figure 3:
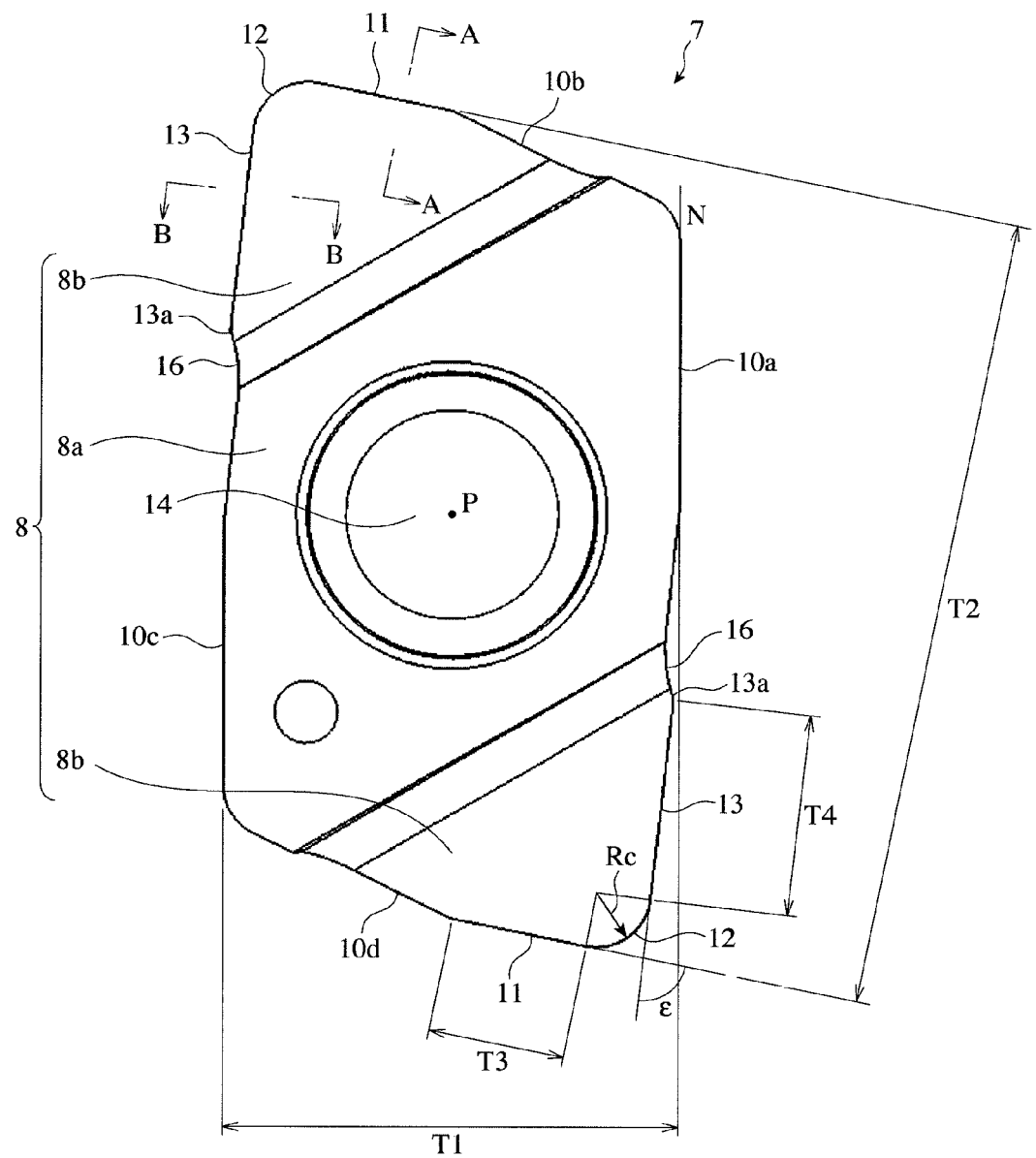
FIG. 3 is a plan view showing the insert of FIG. 2.
Figure 4:
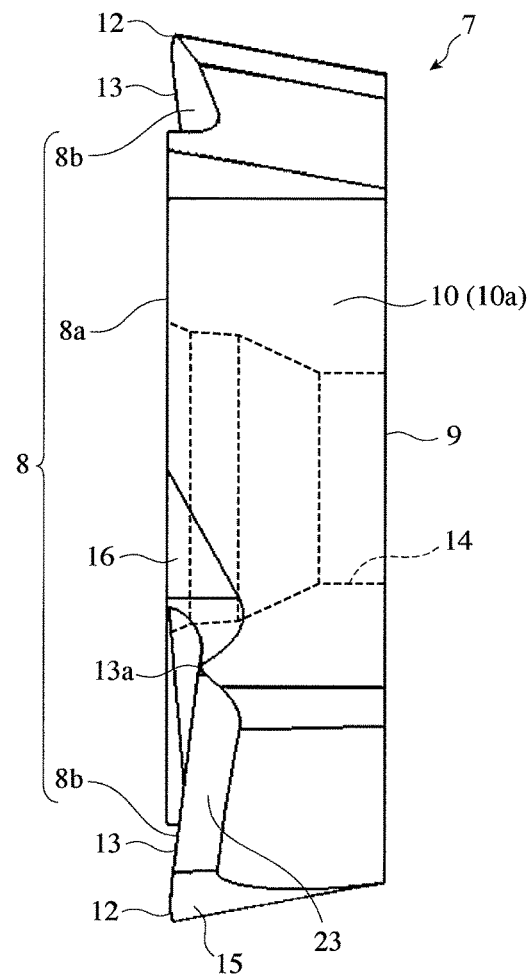
FIG. 4 is a side view showing the insert of FIG. 2.
Figure 5:
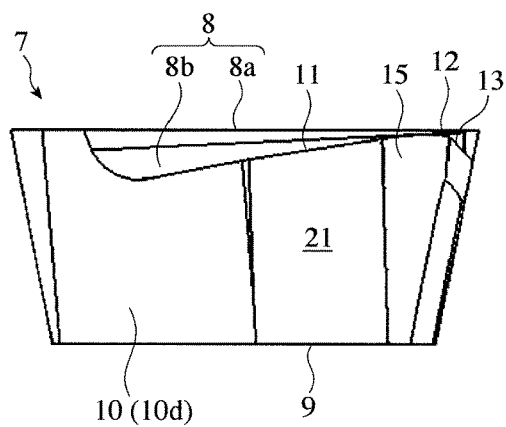
FIG. 5 is a front view showing the insert of FIG. 2.

As shown in FIGS. 2-5, an insert 7 according to the first embodiment of the present invention comprises an upper surface 8 having a substantially parallelogramatic shape, a lower flat surface 9 opposing the upper surface 8, and side surfaces 10 connecting the upper surface 8 to the lower surface 9. The upper surface 8 comprises a first center upper surface region 8a, and second upper surface regions 8b on its both sides. The first upper surface region 8a has a center hole 14 penetrating from an upper surface to a lower surface for receiving a fastening screw. The insert 7 is rotationally symmetric with respect to the center axis P of the center hole 14. As shown in FIGS. 2-4, the center hole 14 is a tapered hole, whose diameter is gradually decreasing toward the lower surface 9 in a thickness direction of the insert 7. The second upper surface region 8b constitutes a common rake face of a bottom cutting edge 11, a corner cutting edge 12 and a peripheral cutting edge 13 as described below.

The upper surface 8 has a pair of opposing long sides 10a, 10c, a pair of opposing short sides 10b, 10d, and four corner portions each connecting each long side 10a, 10c to each short side 10b, 10d. Among them, two acute corner portions are provided with corner cutting edges 12, a ridgeline of the upper surface 8 and the side surface 10 constituting a bottom cutting edge 11 on one side of the corner cutting edge 12 (short side), and a peripheral cutting edge 13 on the other side of the corner cutting edge 12 (long side).

Figure 6:
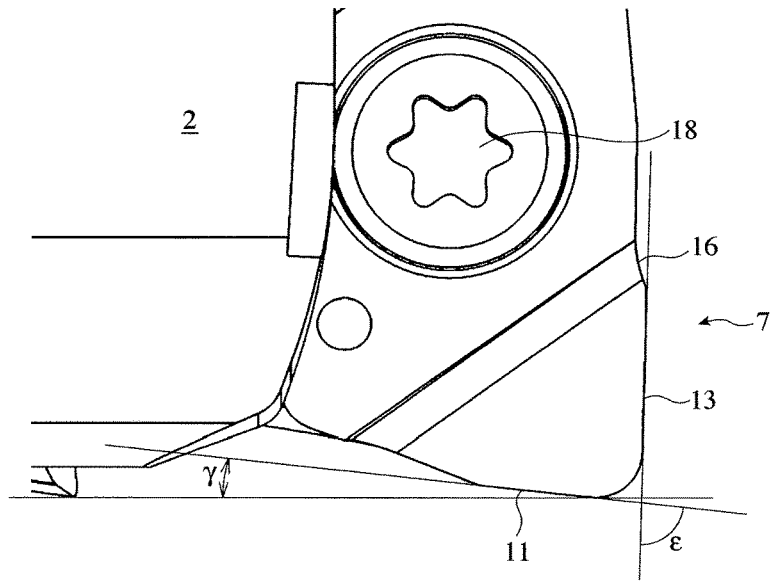
FIG. 6 is a partial enlarged view showing an insert according to the first embodiment of the present invention, which is attached to a tool holder.

When the insert 7 according to the first embodiment of the present invention is attached to the tool holder 2 with its peripheral cutting edge 13 vertical as shown in FIG. 6, the bottom cutting edge 11 is gradually elevated as going rearward from a connecting point to the corner cutting edge 12. Accordingly, the cutting edge angle ε (angle between the bottom cutting edge 11 and the peripheral cutting edge 13) of the corner cutting edge 12 is less than 89.5°. The lower limit of the cutting edge angle ε is preferably 75°. When the cutting edge angle ε is less than 75°, the corner cutting edge 12 is too acute to have sufficient strength. The preferred cutting edge angle ε is 85-89°. When the insert 7 is attached to the tool holder 2 (when the peripheral cutting edge 13 is vertical), the inclination angle γ of the bottom cutting edge 11 is 90°-ε.

Figure 7A:
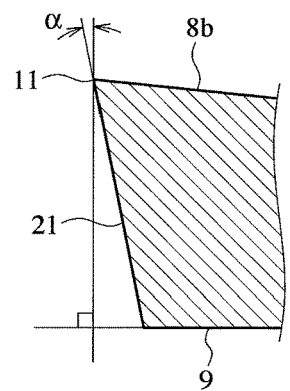
FIG. 7(a) is a cross-sectional view taken along the line A-A in FIG. 3.
Figure 7B:
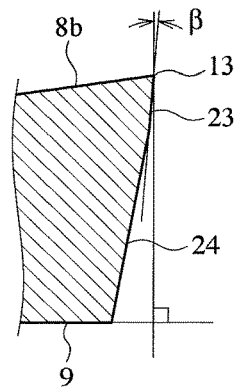
FIG. 7(b) is a cross-sectional view taken along the line B-B in FIG. 3.

The insert 7 of the present invention is characterized in that the clearance angle α of the bottom cutting edge 11 is different from the clearance angle β of the peripheral cutting edge 13. The clearance angle α of the bottom cutting edge 11 is preferably larger than the clearance angle β of the peripheral cutting edge 13. While a flank 21 of the bottom cutting edge 11 extends from the second upper surface region 8b to the lower surface 9 as shown in FIG. 7(a), a flank 23 of the peripheral cutting edge 13 exists only on the upper surface side in the long side surface 10a as shown in FIG. 7(b), to avoid interference with a work when the insert attached to the tool body is rotated. A side surface 24 extending below and receding from the flank 23 of the peripheral cutting edge 13 may be as-sintered, because it does not contact a work and the tool holder 2.

To provide the bottom cutting edge 11 with improved wear resistance, and to have a desired clearance angle when attached to the tool holder 2, as shown in FIG. 7(a), which is a cross-sectional view taken along the line A-A in FIG. 3, the clearance angle α of the bottom cutting edge 11 is preferably as relatively large as 6-12°. When the clearance angle α is less than 6°, the flank of the bottom cutting edge 11 is worn faster, so that the bottom cutting edge 11 has a shorter life. On the other hand, when the clearance angle α is more than 12°, the bottom cutting edge 11 has insufficient strength, resulting in lower breakage resistance. The clearance angle α of the bottom cutting edge 11 is more preferably 10.5-11.5°. To improve the breakage resistance of the peripheral cutting edge 13 subjected to a high load at a high cutting speed, the clearance angle β of the peripheral cutting edge 13 is preferably as relatively small as 4-6°. The more preferred clearance angle β of the peripheral cutting edge 13 is 4.5-5.5°.

Figure 8:
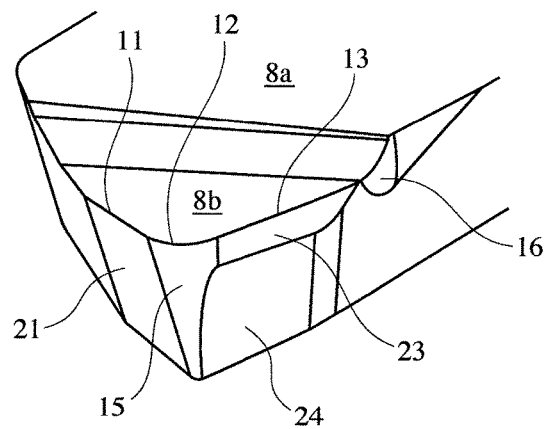
FIG. 8 is a perspective view showing an insert according to the first embodiment of the present invention from the corner cutting edge side.

As shown in FIG. 8, the flank of the corner cutting edge 12 between the bottom cutting edge 11 and the peripheral cutting edge 13 having different clearance angles is provided with an angle-changing surface portion 15 having a clearance angle continuously changing from α to β. For example, when the bottom cutting edge 11 has a clearance angle α of 11°, and the peripheral cutting edge 13 has a clearance angle β of 5°, the flank of the corner cutting edge 12 has an angle-changing surface portion 15 having a clearance angle continuously changing from 11° to 5° along the corner cutting edge. With such angle-changing surface portion 15, the flank 21 of the bottom cutting edge 11 is smoothly connected to the flank 23 of the peripheral cutting edge 13. To have a clearance angle with as small a change ratio as possible, the angle-changing surface portion 15 preferably extends along the entire corner cutting edge 12, though it need only extend in at least 80% of the entire corner cutting edge 12. With the angle-changing surface portion 15 having a clearance angle continuously changing from α to β extending in at least 80% of the flank of the corner cutting edge 12, the concentration of a load to the corner cutting edge 12 during a cutting operation can be prevented, thereby reducing the chipping, breakage, wearing, etc. of the corner cutting edge 12.

As shown in FIGS. 3 and 4, a notch-shaped receding portion 16 is formed adjacently to an upper end 13a of the peripheral cutting edge 13 (on the opposite side to its point connecting to the corner cutting edge 12), along the ridgeline of each long side 10a, 10c extending upward from the peripheral cutting edge 13. The receding portion 16 is dented inward from a straight line N along the ridgeline of the long side. The receding portion 16 has functions of (a) restricting the length of the peripheral cutting edge 13 to prevent increase in cutting resistance, thereby reducing vibration, etc. and improving a finished surface of a work, and (b) improving the dischargeability of chips.

To achieve accurate finishing, the insert 7 of the present invention is small. For example, in the case of the substantially parallelogrammatic insert 7 shown in FIGS. 2-5, the distance T1 between a pair of opposing parallel long sides 10a, 10c is preferably 4-6 mm, and the distance T2 between a pair of opposing parallel short sides 10b, 10d is preferably 6-10 mm. Even if T1 and T2 are the upper limits of 6 mm and 10 mm, respectively, the indexable rotary cutting tool 1 having two inserts 7 attached to a tool holder 2 can have as small an outer diameter as 12 mm or less. With T1 and T2 in the above ranges, a hole 14 for a fastening screw for fixing the insert 7 to the tool holder 2 can be formed. With T1 and T2 smaller than the above lower limits, it is difficult to form a hole 14 having sufficient strength for a fastening screw.

The percentage of the length T3 of the bottom cutting edge 11 to the distance T1 between the long sides is preferably 10-40%, more preferably 15-35%. When the length T3 of the bottom cutting edge 11 is less than 10%, the bottom cutting edge 11 is too short, resulting in low finishing efficiency. When the length T3 of the bottom cutting edge 11 is more than 40%, the bottom cutting edge 11 is too long, causing vibration, and thus failing to obtain a good finished surface.

The percentage of the length T4 of the peripheral cutting edge 13 to the distance T1 between the long sides is preferably 25-50%, more preferably 30-50%. When the length T4 of the peripheral cutting edge 13 is less than 25%, the peripheral cutting edge 13 is too short, resulting in low finishing efficiency of a vertical wall. On the other hand, when the length T4 of the peripheral cutting edge 13 is more than 50%, the peripheral cutting edge 13 is too long, resulting in vibration, and thus failing to obtain a good finished surface.

The percentage of the radius Rc of the corner cutting edge 12 to the distance T1 between the long sides is preferably 4-25%. When the radius Rc of the corner cutting edge 12 is less than 4%, the corner cutting edge 12 is too sharp and short, having insufficient mechanical strength, and thus likely suffering chipping and breakage. On the other hand, when the radius Rc of the corner cutting edge 12 is more than 25%, the corner cutting edge 12 is too long, failing to have sufficiently long bottom cutting edge 11 and peripheral cutting edge 13.

(2) Indexable Rotary Cutting Tool

Figure 9:
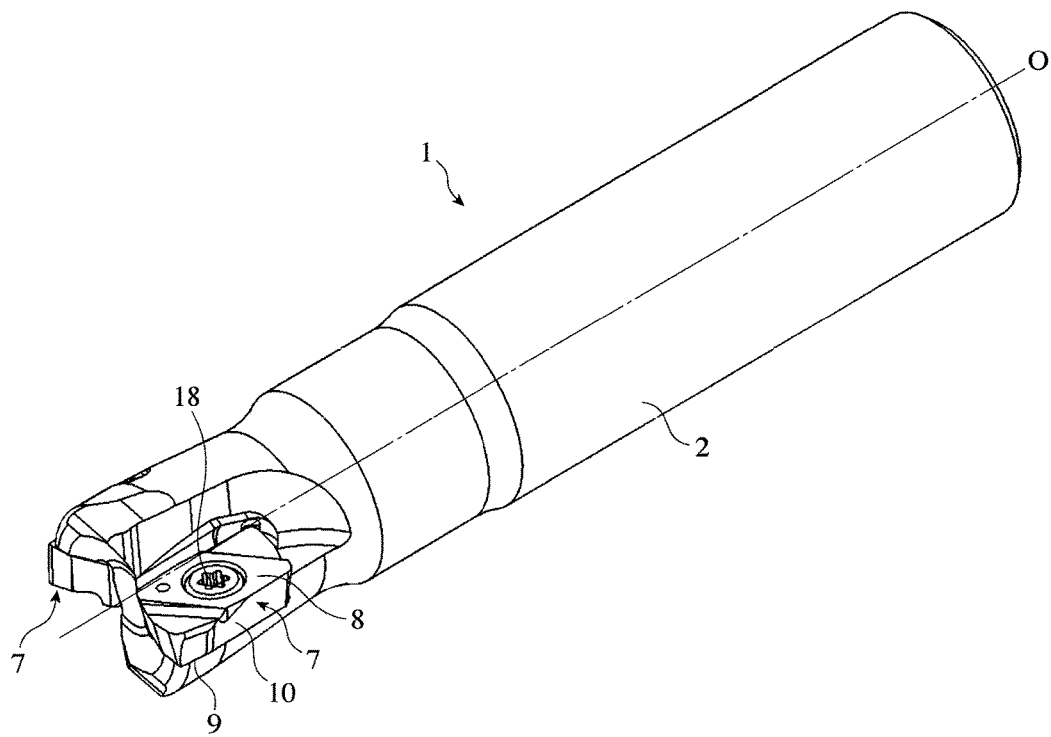
FIG. 9 is a perspective view showing an indexable rotary cutting tool comprising the inserts of FIG. 2 attached to the tool holder of FIG. 1.
Figure 10:
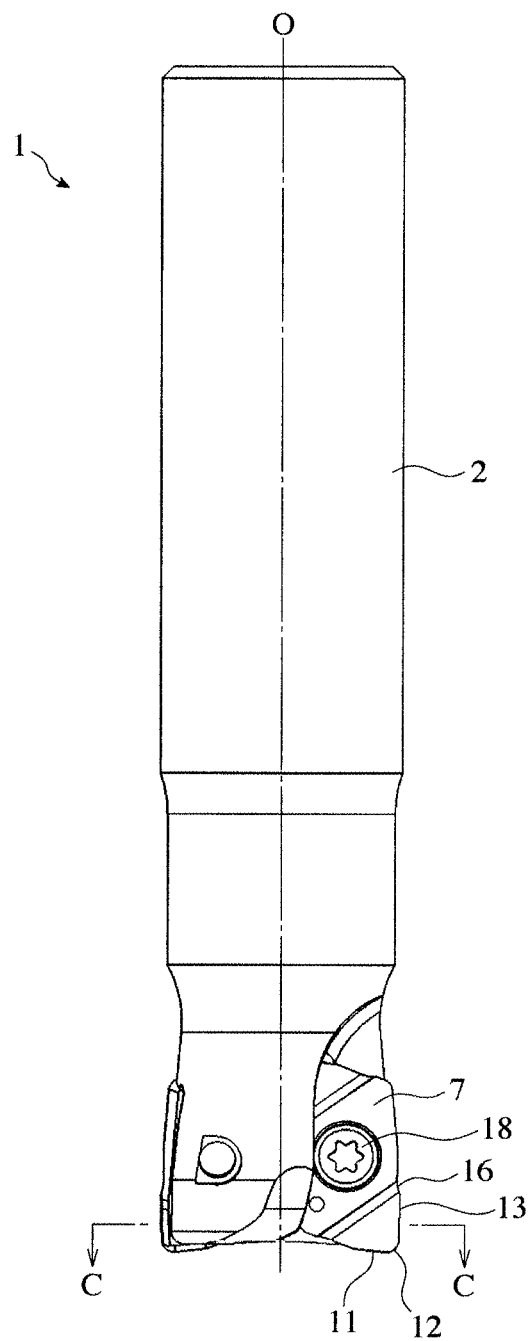
FIG. 10 is a side view showing the indexable rotary cutting tool of FIG. 9.
Figure 11:
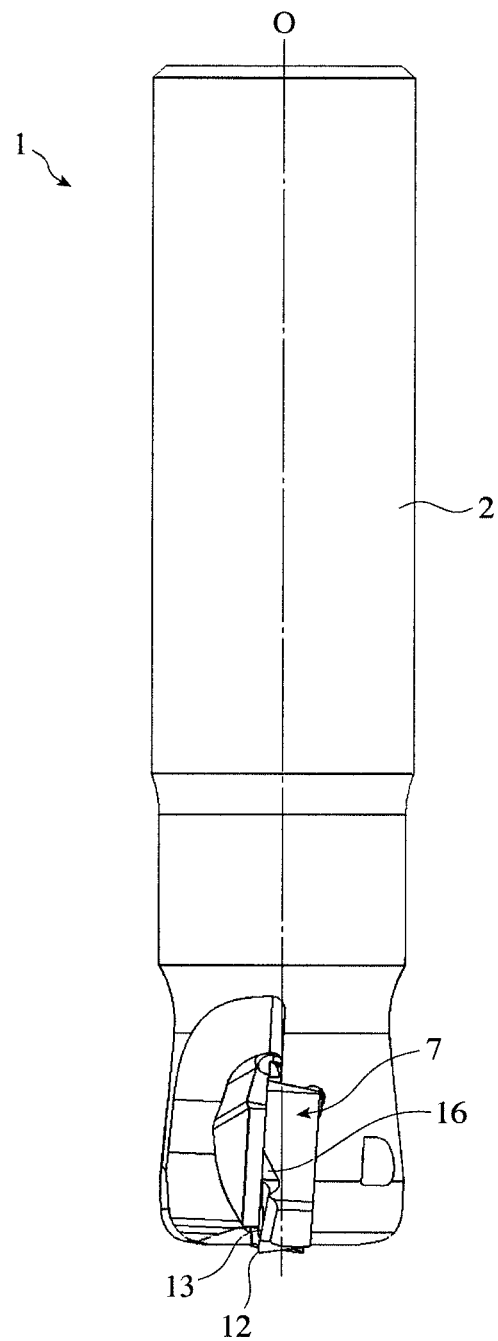
FIG. 11 is a side view showing the indexable rotary cutting tool of FIG. 9 in direction a perpendicular to FIG. 10.

As shown in FIG. 9, each insert 7 is attached to each insert seat 3 of a tool holder 2, and a clamp screw 18 penetrating a center hole 14 of each insert 7 is threadably fixed to a threaded hole 17 of the seat surface 4, so that a short side surface 10b (or 10d) of each insert 7 is firmly pressed to two rear wall surfaces 5 of each insert seat 3, and that a long side surface 10c (or 10a) of each insert 7 is firmly pressed to a side wall surface 6 of the insert seat 3. As a result, each insert 7 is fixed to each insert seat 3. As shown in FIG. 10, the peripheral cutting edge 13 of each insert 7 fixed to the insert seat 3 is in parallel to the rotation axis O. In this example, as shown in FIG. 11, an upper end of the insert 7 is inclined slightly rearward.

In the insert 7 attached to each insert seat 3 of the tool holder 2, one corner cutting edge 12, and a bottom cutting edge 11 and a peripheral cutting edge 13 on both sides thereof are used for cutting. When the bottom cutting edge 11, the corner cutting edge 12 and the peripheral cutting edge 13 used for cutting are worn, the clamp screw 18 is loosened to rotate the insert 7 by 180° and then attach it to the insert seat 3 again, to use unused bottom cutting edge 11, corner cutting edge 12 and peripheral cutting edge 13.

Figure 12:
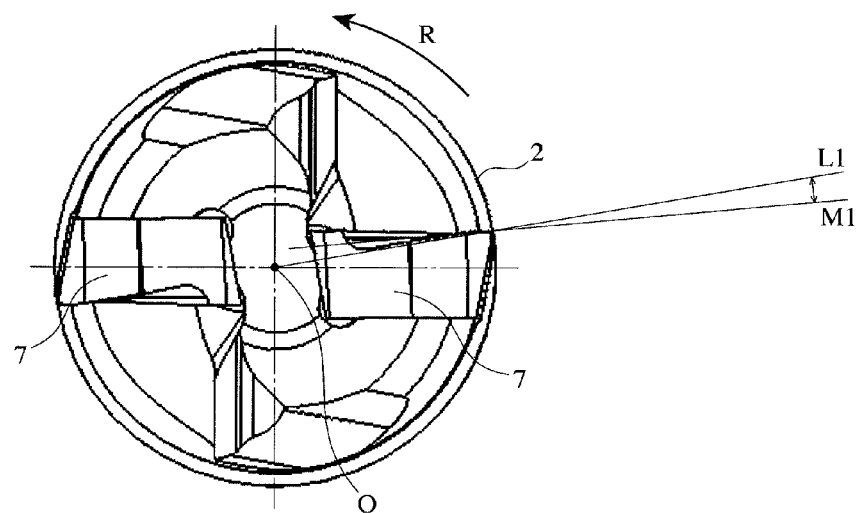
FIG. 12 is a front view showing the indexable rotary cutting tool of FIG. 9.
Figure 13:
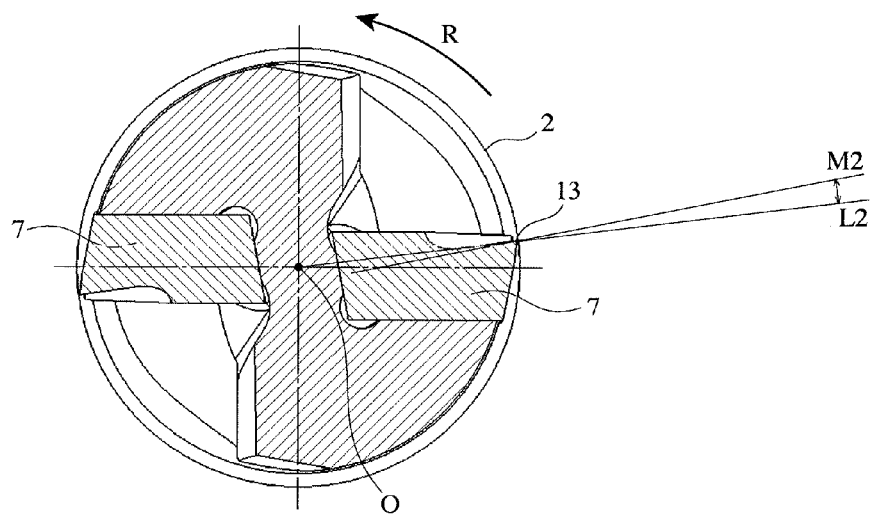
FIG. 13 is a cross-sectional view taken along the line C-C in FIG. 10.

In the indexable rotary cutting tool 1 having inserts 7 detachably attached to its tool holder 2, the bottom cutting edge 11 and the corner cutting edge 12 have negative radial rake angles, the peripheral cutting edge 13 has a radial rake angle changing from negative to positive, and the length of a region having a positive radial rake angle in the peripheral cutting edge 13 is 50% or more of the entire length of each peripheral cutting edge 13. "The bottom cutting edge 11 having a negative radial rake angle" means, as shown in FIG. 12, that a straight line M1 extending from the bottom cutting edge 11 is positioned rearward from a straight line L1 connecting the rotation axis O and the outermost end of the bottom cutting edge 11 in a tool rotation direction R. "The peripheral cutting edge 13 having a positive radial rake angle" means, as shown in FIG. 13, that a straight line M2 extending from the rake face 23 of the peripheral cutting edge 13 is positioned forward from a straight line L2 connecting the rotation axis O and the outermost end of the peripheral cutting edge 13 in a tool rotation direction R.

The bottom cutting edge 11 of the insert 7 attached to the tool holder 2 preferably has a radial rake angle of −3° to −0.5°. When the radial rake angle of the bottom cutting edge 11 is less than −3°, the radial rake angle of the bottom cutting edge 11 is too small, making it difficult to design a radial rake angle changing from negative to positive from the bottom cutting edge to the peripheral cutting edge. When the radial rake angle of the bottom cutting edge 11 is more than −0.5°, the cut surface condition of a work is likely deteriorated.

The radial rake angle of the peripheral cutting edge 13 of the insert 7 attached to tool holder 2 changes from negative to positive, preferably in a range from −0.5° to +3°. With the length of a region having a positive radial rake angle in the peripheral cutting edge 13 being 50% or more of the entire length of each peripheral cutting edge 13, the entire peripheral cutting edge 13 can keep good cutting performance.

Figure 14:
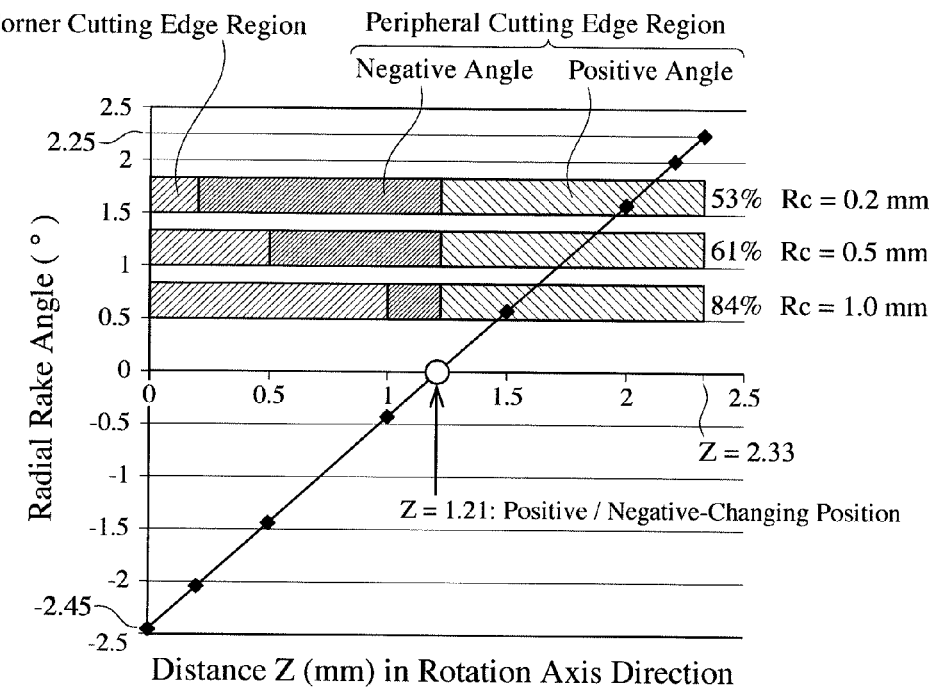
FIG. 14 is a graph showing the relation between the radial rake angles of a corner cutting edge and a peripheral cutting edge and the distance in a rotation axis direction, in an indexable rotary cutting tool to which the inserts according to the first embodiment of the present invention are attached.

As shown in FIG. 14, the radial rake angle preferably changes linearly from negative to positive from the bottom cutting edge 11 to the peripheral cutting edge 13, along the rotation axis direction Z of the tool 1. In the example shown in FIG. 14, when the corner cutting edge 12 has a radius Rc of 0.5 mm, the radial rake angle is −2.45° at the outermost end of the bottom cutting edge 11 (inner end of the corner cutting edge 12), about −1.5° at the lower end of the peripheral cutting edge 13 (outer end of the corner cutting edge 12), and +2.25° at the upper end of the peripheral cutting edge 13, changing from negative to positive at a position of 1.21 mm from the tip end of the tool 1 (inner end of the corner cutting edge 12) in a rotation axis direction Z. Also, when the corner cutting edge 12 has a radius Rc of 0.2 mm, the radial rake angle is −2.45° at the outermost end of the bottom cutting edge 11, about −2° at the lower end of the peripheral cutting edge 13, and +2.25° at the upper end of the peripheral cutting edge 13, changing from negative to positive at a position of 1.21 mm from the tip end of the tool 1 in a rotation axis direction Z. Further, when the corner cutting edge 12 has a radius Rc of 1.0 mm, the radial rake angle is −2.45° at the outermost end of the bottom cutting edge 11, about −0.5° at the lower end of the peripheral cutting edge 13, and +2.25° at the upper end of the peripheral cutting edge 13, changing from negative to positive at a position of 1.21 mm from the tip end of the tool 1 in a rotation axis direction Z.

With the bottom cutting edge 11 having a negative radial rake angle, the direction of discharging chips can be controlled outside a rotation locus of the peripheral cutting edge 13, avoiding a finished bottom surface of a work from being damaged. Accordingly, the deterioration of a finished surface by biting chips can be effectively prevented, maintaining a good finished surface condition. Oppositely, when the radial rake angle of the bottom cutting edge 11 is positive, chips are not easily separated from the bottom cutting edge 11, resulting in a poor finished surface by biting chips. Also, with 50% or more of the peripheral cutting edge 13 having a positive radial rake angle, the cutting resistance can be reduced, thereby suppressing vibration. Oppositely, when the peripheral cutting edge 13 has a negative radial rake angle, the peripheral cutting edge 13 does not well cut a work, generating vibration.

When each insert 7 is fixed to the tool holder 2, the clearance angle of the bottom cutting edge 11 of the insert 7 is preferably in a range of 5-10°, and the clearance angle of the peripheral cutting edge 13 is preferably in a range of 10-18°.

(3) Cutting

Figure 15:
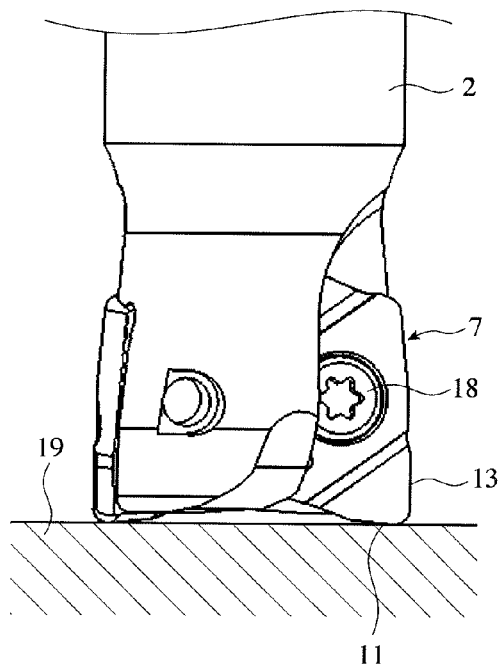
FIG. 15 is a view showing face milling with an indexable rotary cutting tool having the inserts according to the first embodiment of the present invention.
Figure 16:
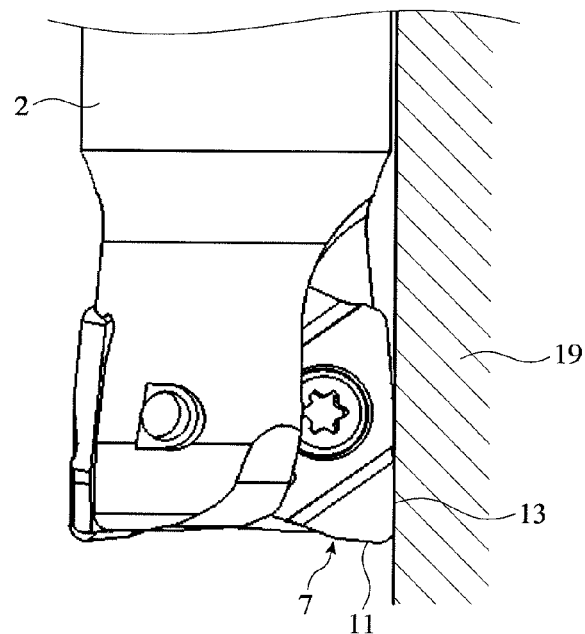
FIG. 16 is a view showing the cutting of a vertical wall with an indexable rotary cutting tool having the inserts according to the first embodiment of the present invention.

FIG. 15 shows horizontal cutting using an indexable rotary cutting tool 1 having the inserts 7 in the first embodiment, and FIG. 16 shows the cutting of a vertical wall using the same indexable rotary cutting tool 1.

[2] Second Embodiment

Figure 17:
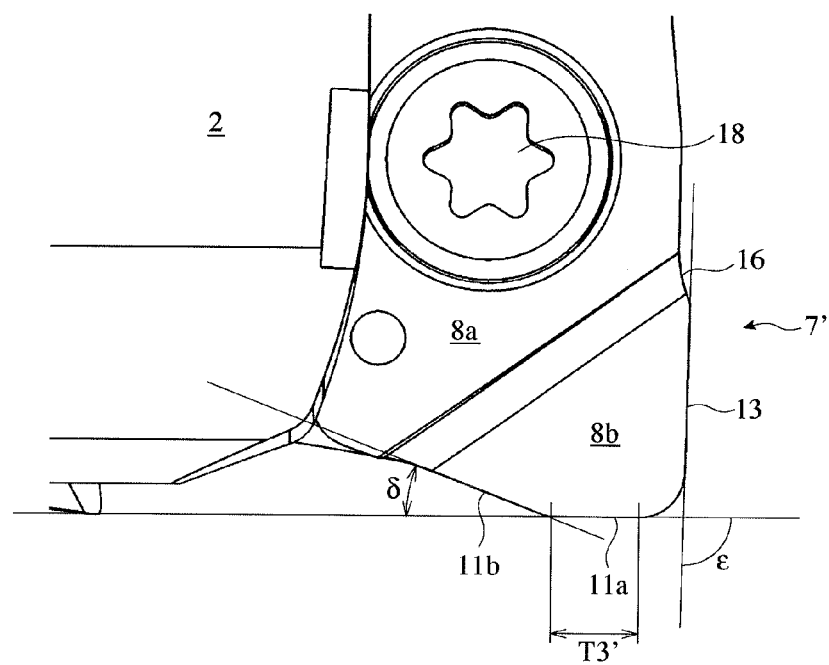
FIG. 17 is a partial enlarged view showing an insert according to the second embodiment of the present invention, which is attached to a tool holder.

As shown in FIG. 17, an insert 7' according to the second embodiment of the present invention does not differ from the insert 7 according to the first embodiment of the present invention, except that a bottom cutting edge 11 of the former is a wiper edge 11a perpendicular to a peripheral cutting edge 13. Accordingly, the insert 7' in the second embodiment can be attached to the same tool holder 2 as that of the insert 7 in the first embodiment. Thus, with respect to the insert 7' in the second embodiment and an indexable rotary cutting tool having inserts 7' attached thereto, only those related to the wiper edge 11a will be explained below, with other portions' explanations omitted.

As shown in FIG. 17, the percentage of the length T3' of the wiper edge 11a to the distance T1 between the long sides is preferably 8-25%, more preferably 10-24%, most preferably 12-23%. When the length T3' of the wiper edge 11a is less than 8%, the wiper edge 11a is too short, providing low finishing efficiency. When the length T3' of the wiper edge 11a is more than 25%, the wiper edge 11a is too long, generating vibration, and failing to obtain a good finished surface. The percentages of the length T4 of the peripheral cutting edge 13 and the radius Rc of the corner cutting edge 12 to the distance T1 between the long sides may be the same as in the first embodiment.

As shown in FIG. 17, when the insert 7' is attached to a tool holder 2 with the peripheral cutting edge 13 being vertical, the wiper edge 11a is substantially horizontal. Accordingly, the cutting edge angle ε of the corner cutting edge 12 (an angle between the bottom cutting edge 11 and the peripheral cutting edge 13) is 89.5-90°. To restrict the length T3' of the wiper edge 11a, an inclined surface 11b connected to the inner end of the wiper edge 11a preferably has an inclination angle δ in a range of 75-89.5°.

[3] Third Embodiment (1) Insert

Figure 18:
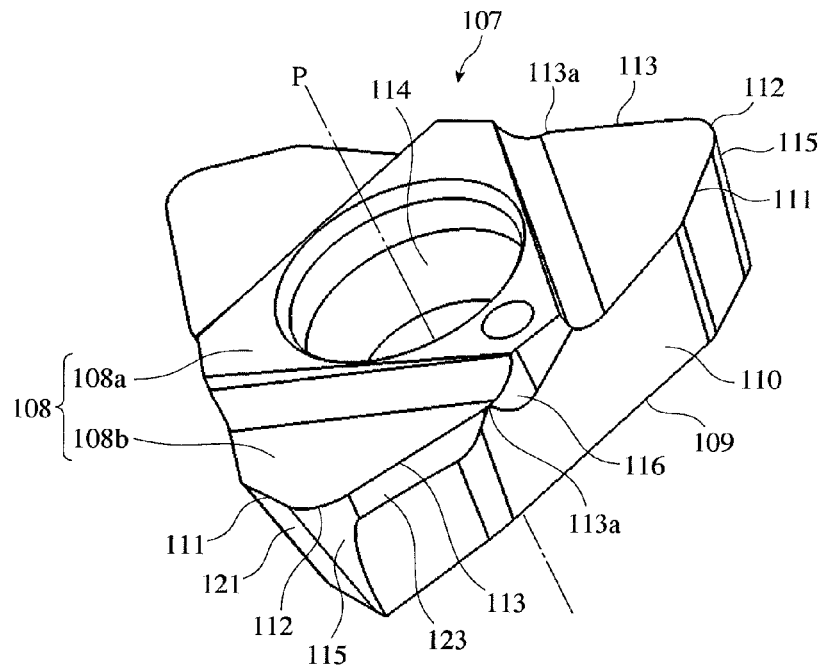
FIG. 18 is a perspective view showing an insert according to the third embodiment of the present invention.
Figure 19:
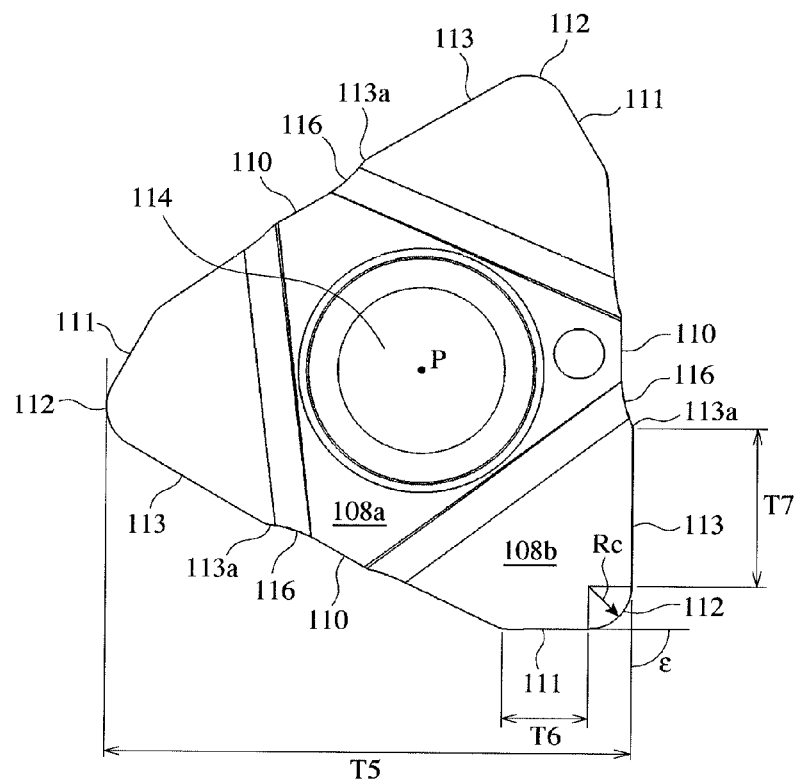
FIG. 19 is a plan view showing the insert of FIG. 18.

As shown in FIGS. 18 and 19, an insert 107 according to the third embodiment of the present invention comprises an upper surface 108 having a substantially equilateral-triangular shape, a lower flat surface 109 opposing the upper surface 108, and side surfaces 110 connecting the upper surface 108 and the lower surface 109. The upper surface 108 comprises a first central upper surface region 108a having a substantially equilateral-triangular shape, and second upper surface regions 108b each extending from the first central upper surface region 108a and having a substantially equilateral-triangular shape. The first upper surface region 108a has a center hole 114 for a fastening screw, which penetrates from the upper surface to the lower surface. With respect to the center axis P of the center hole 114, the insert 107 has rotational symmetry. The center hole 114 is a tapered hole having a diameter gradually decreasing toward the lower surface 109 in a thickness direction of the insert 107. Each second upper surface region 108b constitutes a rake face for a bottom cutting edge 111, a corner cutting edge 112 and a peripheral cutting edge 113, as described below.

Each second upper surface region 108b has a corner cutting edge 112 in a tip end corner portion, and a bottom cutting edge 111 and a peripheral cutting edge 113 on both sides of the corner cutting edge 112 along ridgelines of the upper surface 108 and the side surface 110. Though the bottom cutting edge 111 is a wiper edge perpendicular to the peripheral cutting edge 113 (cutting edge angle ε=90°) in the depicted example, the bottom cutting edge may, of course, have a cutting edge angle ε of 80° or more and less than 90° as in the first embodiment.

Like the insert 7 having a substantially quadrilateral shape, the clearance angle α of the bottom cutting edge 111 is also different from the clearance angle β of the peripheral cutting edge 113 in the insert 107 having a substantially equilateral-triangular shape. The clearance angle α of the bottom cutting edge 111 is preferably larger than the clearance angle β of the peripheral cutting edge 113. Specifically, the clearance angle α of the bottom cutting edge 111 is preferably 6-12°, more preferably 10-12°. The clearance angle β of the peripheral cutting edge 13 is preferably 3-11°, more preferably 4-6°.

As in the insert 7 having a substantially quadrilateral shape, a flank of the corner cutting edge 112 between the bottom cutting edge 111 and the peripheral cutting edge 113 having different clearance angles is provided with an angle-changing surface portion 115 having a clearance angle continuously changing from α to β. With the angle-changing surface portion 115, the flank of the bottom cutting edge 111 is smoothly connected to the flank of the peripheral cutting edge 113. To have as small a change ratio of the clearance angle as possible, the angle-changing surface portion 115 is preferably provided in the entire length of the corner cutting edge 112, though it may be at least 80% of the entire length of the corner cutting edge 112. With the angle-changing surface portion 115 having a clearance angle continuously changing from α to β provided in at least 80% of the flank of the corner cutting edge 112, the concentration of a load in the corner cutting edge 112 can be prevented, thereby reducing the chipping, breakage, wearing, etc. of the corner cutting edge 112.

As shown in FIGS. 18 and 19, a receding portion 116 is formed adjacently to an upper end 113a of the peripheral cutting edge 113 (on the opposite side to the point connecting to the corner cutting edge 112), along a ridgeline of the long side extending upward from the peripheral cutting edge 113. The receding portion 116 has functions of (a) restricting the length of the peripheral cutting edge 113 to prevent increase in cutting resistance, reducing vibration, etc., and thus improving a finished surface of a work, and (b) improving the dischargeability of chips.

Like the insert 7 having a substantially quadrilateral shape, the insert 107 having a substantially equilateral-triangular shape is small. In the example shown in FIGS. 18 and 19, the perpendicular distance (distance in a direction perpendicular to the rotation axis O of the tool 1) T5 between one peripheral cutting edge 113 and a corner cutting edge 112 farthest therefrom is preferably 5-8 mm.

In the example shown in FIG. 19, the percentage of the length T6 (1.0 mm) of the bottom cutting edge 111 to the perpendicular distance T5 (6.5 mm) is about 16%, the percentage of the length T7 (1.92 mm) of the peripheral cutting edge 113 to the perpendicular distance T5 is about 30%, and the percentage of the radius Rc of the corner cutting edge 112 to the perpendicular distance T5 is about 7%. Accordingly, T6/T5 is preferably 10-35%, more preferably 15-19%. T7/T5 is preferably 15-40%, more preferably 28-34%. Rc/T5 is preferably 2.5-20%.

(2) Indexable Rotary Cutting Tool

Of course, the insert 107 having a substantially equilateral-triangular shape is used in a suitable tool holder (not shown). As in the case of the insert 7 having a substantially quadrilateral shape, each insert 107 is attached to an insert seat of the tool holder, and a clamp screw penetrating a center hole 114 of each insert 107 is threadably fastened to a threaded hole of the seat surface, firmly pressing a side surface 110 (including the flank of the bottom cutting edge 111 and the flank of the peripheral cutting edge 113) of the insert 107 to the rear wall surface and side wall surface of the insert seat, so that the insert 107 is fixed to the insert seat.

Because the insert 107 having a substantially equilateral-triangular shape has three corner portions, three sets of bottom cutting edges 111, corner cutting edges 112 and peripheral cutting edges 113 can be successively used by changing the attaching angle of the insert 107 to the insert seat of the tool holder. Namely, a bottom cutting edge 111, a corner cutting edge 112 and a peripheral cutting edge 113 in one corner portion of the insert 107 attached to the insert seat of the tool holder is first used for cutting, and after they are worn, a clamp screw is loosened to rotate the insert 107 by 120°, and the insert 107 is attached to the insert seat again. This operation is conducted for three corner portions, to use all of the bottom cutting edges 111, the corner cutting edges 112 and the peripheral cutting edges 113.

As in the insert 7 having a substantially quadrilateral shape, in an indexable rotary cutting tool having inserts 107 each having a substantially equilateral-triangular shape and detachably attached to a tool holder, the bottom cutting edges 107 and the corner cutting edges 112 have negative radial rake angles, the peripheral cutting edges 113 have radial rake angles changing from negative to positive, and the length of a region having a positive radial rake angle in each peripheral cutting edge 113 is 50% or more of the entire length of the peripheral cutting edge 113. With the bottom cutting edge 111 having a negative radial rake angle, chips can be discharged outside, avoiding a finished bottom surface of a work from being damaged. The radial rake angle of the bottom cutting edge 111 is preferably −3° to −0.5°. The radial rake angle of the peripheral cutting edge 113 preferably changes from negative to positive in a range from −0.5° to +3°, with the length of a positive region being 50% or more of its entire length. With 50% or more of the peripheral cutting edge 113 having a positive radial rake angle, the cutting resistance can be reduced, thereby suppressing vibration. The radial rake angle preferably changes linearly from negative to positive along the rotation axis direction Z of the tool 1, in a region from the bottom cutting edge 111 to the peripheral cutting edge 113.

When the insert 107 is fixed to the tool holder, the clearance angle of the bottom cutting edge 111 of the insert 107 is preferably in a range of 5-10°, and the clearance angle of the peripheral cutting edge 113 is preferably in a range of 10-18°.

[4] Production Method (1) Insert

An insert substrate can be produced by press-molding cemented carbide powder comprising WC (tungsten carbide) powder, Co powder and a binder, and sintering the resultant green body at a temperature of 1300-1400° C. Necessary portions of the insert substrate are ground by a diamond grinder. Taking the insert 7 having a substantially quadrilateral shape in the first embodiment for example, the grinding of the insert substrate will be explained in detail below.

The rake faces 8b and flanks 21, 23 of bottom cutting edges 11 and peripheral cutting edges 13, and flanks of corner cutting edges 12 and their angle-changing surface portions 15 are preferably ground surfaces, to increase the dimensional accuracy of each cutting edge, and to improve the positional accuracy of each cutting edge when the insert 7 is attached to a seat surface 4 of the tool holder 2. The finishing accuracy of a work and the attaching accuracy of an exchanged insert 7 are also improved. Further, the dimensional variations of honed corner cutting edges 12 and lands and breaker grooves inside the honed corner cutting edges 12 are reduced, stabilizing the dischargeability of chips. The strength variations of corner cutting edges 12 are also suppressed, resulting in a stable cutting edge life. When a flank 23 of each peripheral cutting edge 13 is formed only on part of the insert side surface as shown in FIG. 7(b), such portion need only be ground, resulting in low grinding cost. A receding portion 16 adjacent to each peripheral cutting edge 13 may have an as-cast surface to reduce the production cost of the insert 7.

(2) Tool holder

The tool holder 2 can be produced by forming insert seats 3 in a tip end portion of a round rod of alloyed tool steel such as SKD61, etc. by cutting with an end mill, etc., and forming threaded holes 17 with a small-diameter drill and a small-diameter tap.

The present invention will be explained in more detail by Examples below without intention of restricting the scope of the present invention.

EXAMPLE 1

Cemented carbide inserts each having a shape in the first embodiment were produced, and attached to an SKD61-made tool holder (cutting edge diameter: 10 mm, shank diameter: 10 mm, length: 80 mm, under-neck length: 20 mm), and mounted to a machining center. A work described below was cut by this tool, to evaluate the damage of cutting edges and cut surface conditions of the work. The specification of the insert, and the specification of an indexable rotary cutting tool having inserts attached to insert seats of the tool holder were as follows.

(1) Specification of Insert

Distance T1 between long sides: 4.3 mm

Distance T2 between short sides: 7.1 mm

Thickness: 2 mm

Bottom cutting edge 11

Length T3: 1.3 mm

Clearance angle α: +11°

Peripheral cutting edge 13

Length T4: 1.8 mm

Clearance angle β: +5°

Corner cutting edge 12

Radius Rc: 0.5 mm

Cutting edge angle ε: 84°

Angle-changing surface portion 15: clearance angle continuously changing from +11° to +5°

(2) Specification of Indexable Rotary Cutting Tool
Cutting edge diameter: 12 mm
Number of inserts: 3
Bottom cutting edge 11
   Clearance angle: +8°
   Radial rake angle: −2°
Peripheral cutting edge 13
   Clearance angle: +14° (changing from +11° to +14°)
   Axial rake angle: +10°
   Radial rake angle: +2° (maximum +2.25°)
   Radial-rake-angle-positive region: 61%

Using the indexable rotary cutting tool 1 having the above specification, a cutting test was conducted on horizontal and vertical walls of a work 19 made of a plastic-molding die material S50C (220 HB). The cutting conditions were as follows.

(1) Cutting Conditions of Flat Surface (see FIG. 15)
Cutting method: dry cutting (air blowing)
Cutting speed Vc: 200 m/min
Number of rotation n: 5307 min$^{-1}$
Feed speed Vf: 1592 mm/min
Feed per one edge fz: 0.1 mm/t
Axial cutting depth ap: 0.1 mm
Radial cutting depth ae: 9 mm
Tool overhang length: 50 mm (2) Cutting Conditions of Vertical Wall (see FIG. 16)
Cutting method: dry cutting (air blowing)
Cutting speed Vc: 200 m/min
Number of rotation n: 5307 min$^{-1}$
Feed speed Vf: 1592 mm/min
Feed per one edge fz: 0.1 mm/t
Axial cutting depth ap: 0.5 mm
Radial cutting depth ae: 0.1 mm
Tool overhang length: 50 mm The test results indicate that cut horizontal and vertical walls had good finished surfaces, with any of the bottom cutting edge 11, the corner cutting edge 12 and the peripheral cutting edge 13 normally worn without chipping and breakage. The specification of the insert 7 used for the cutting test is shown in Table 1, and the specification of the indexable rotary cutting tool 1 is shown in Table 2. The maximum surface roughness Rz of the work 19 in a cut vertical wall is shown in Table 3.

EXAMPLE 2

A cutting test was conducted on horizontal and vertical walls of a work 19 of S50C (220 HB) in the same manner as in Example 1, except for using an insert 7' in the second embodiment, whose bottom cutting edge was a wiper edge 11a, in place of the insert 7 in the first embodiment. The specification of the insert 7' was as follows.
Distance T1 between long sides: 4.3 mm
Distance T2 between short sides: 7.1 mm
Thickness: 2 mm
Bottom cutting edge (wiper edge) 11a
   Length T3: 0.5 mm
   Clearance angle α: +11°
Peripheral cutting edge 13
   Length T4: 1.8 mm
   Clearance angle β: +5°
Corner cutting edge 12
   Radius Rc: 0.5 mm
   Cutting edge angle ε: 90°
   Angle-changing surface portion 15: clearance angle continuously changing from +11° to +5°

Figure 20:
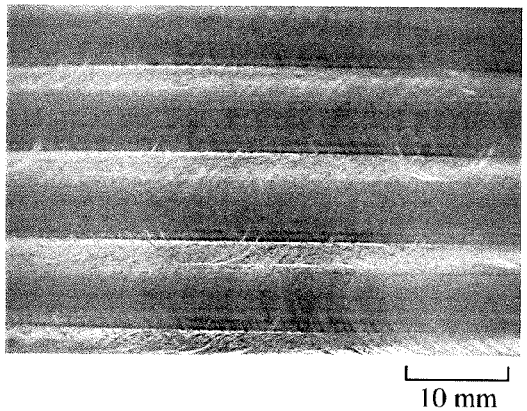
FIG. 20 is a photomicrograph showing a surface condition of a work face-milled with the indexable rotary cutting tool of Example 2.
Figure 22:
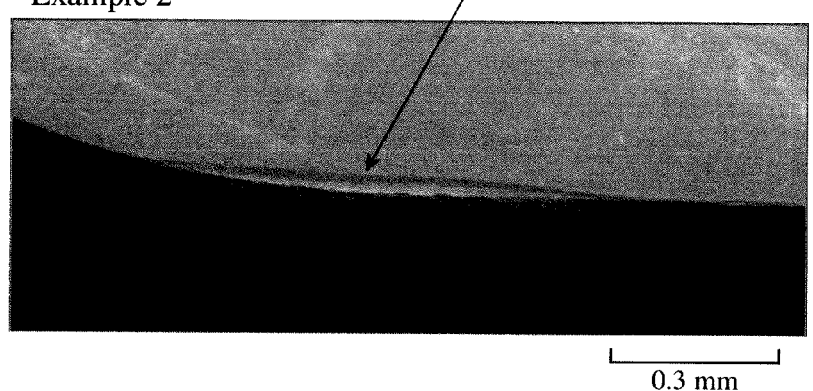
FIG. 22 is a photomicrograph showing a damaged cutting edge of an insert in the indexable rotary cutting tool of Example 2, which milled a vertical wall.

The specification of the insert 7' is shown in Table 1, and the specification of the indexable rotary cutting tool 1 is shown in Table 2. FIG. 20 shows a flat-cut surface condition of the work 19, Table 3 shows the maximum surface roughness Rz of the work in a cut vertical wall, and FIG. 22 shows the damage of the peripheral cutting edge 13 of the insert 7' by this cutting.

COMPARATIVE EXAMPLE 1

Figure 21:
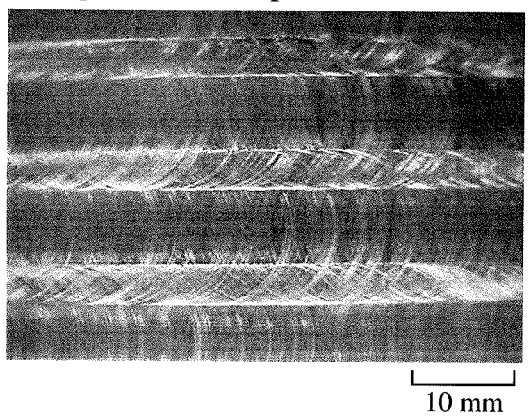
FIG. 21 is a photomicrograph showing a surface condition of a work face-milled with the indexable rotary cutting tool of Comparative Example 1.
Figure 23:
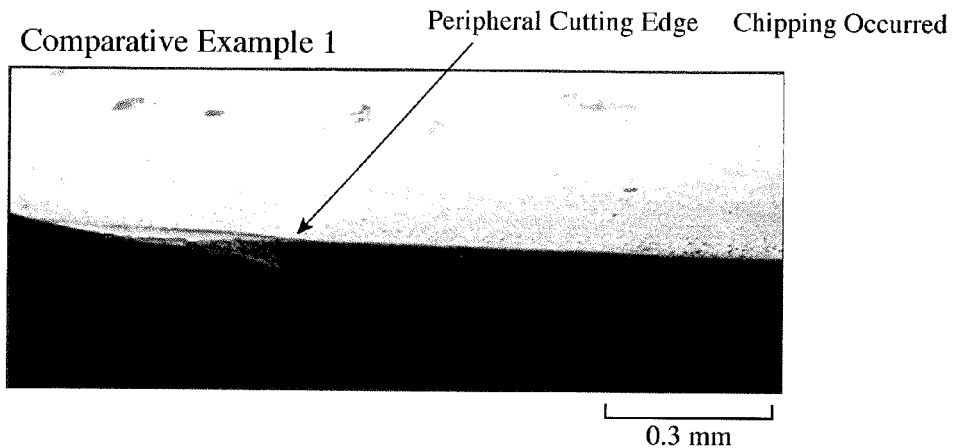
FIG. 23 is a photomicrograph showing a damaged cutting edge of an insert in the indexable rotary cutting tool of Comparative Example 1, which milled a vertical wall.
Figure 24A:
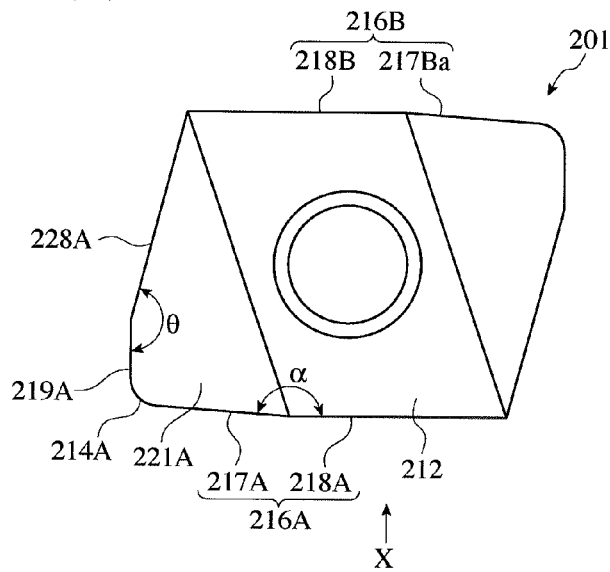
FIG. 24(a) is a plan view showing a cutting tool insert disclosed in JP 2003-19617 A.
Figure 24B:
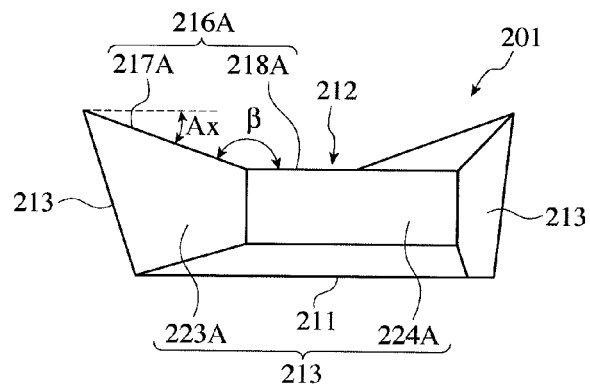
FIG. 24(b) is a side view showing the insert of FIG. 24(a) in an X direction.
Figure 25A:
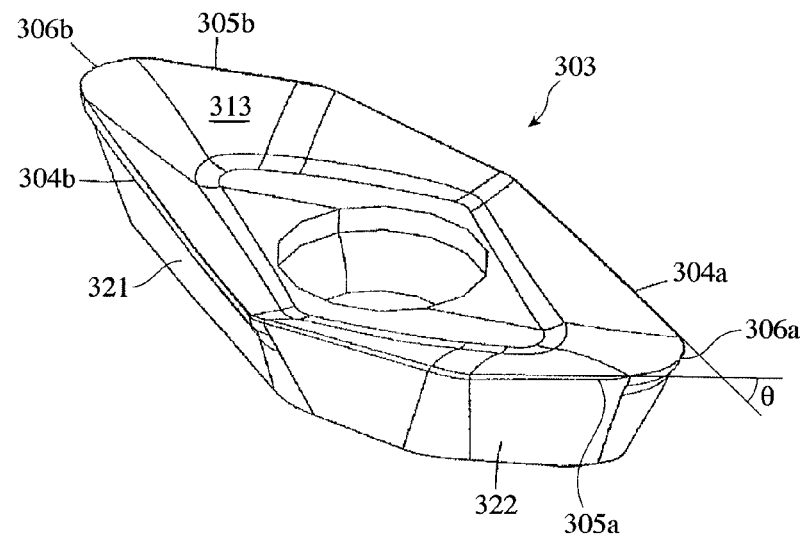
FIG. 25(a) is a perspective view showing a cutting insert disclosed in JP 8-66815 A.
Figure 25B:
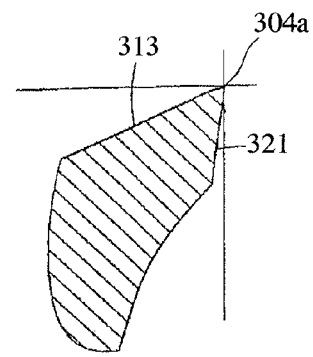
FIG. 25(b) is a cross-sectional view showing a main cutting edge of the cutting insert of FIG. 25(a).
Figure 25C:
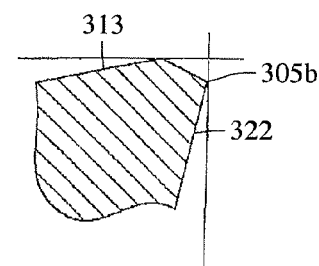
FIG. 25(c) is a cross-sectional view showing an auxiliary cutting edge of the cutting insert of FIG. 25(a).

A cutting test of horizontal and vertical walls of a work 19 was conducted in the same manner as in Example 2, except for changing the specifications of the insert and the indexable rotary cutting tool as shown in Tables 1 and 2. The specification of the insert is shown in Table 1, and the specification of the cutting tool is shown in Table 2. A flat-cut surface condition of the work 19 is shown in FIG. 21, the maximum surface roughness Rz of the work in a cut vertical wall is shown in Table 3, and the damage of the cutting edge by this cutting is shown in FIG. 23.

COMPARATIVE EXAMPLE 2

Using the same insert as in Example 2 except for having no angle-changing surface portion 15 having a continuously changing clearance angle in a corner cutting edge 12, the same cutting test as in Example 2 was conducted. The specification of the insert is shown in Table 1, the specification of the cutting tool is shown in Table 2, and the maximum surface roughness Rz of the work 19 in a cut vertical wall is shown in Table 3.

TABLE 1

| | | Specification of Insert | | | |
|---|---|---|---|---|---|
| | | Bottom Cutting Edge | | Peripheral Cutting Edge | |
| No. | Thickness (mm) | α[1] (°) | T3[2] (mm) | β[3] (°) | T4[4] (mm) |
| Example 1 | 2 | +11 | 0.5 | +5 | 2 |
| Example 2 | 2 | +11 | 0.5 | +5 | 2 |
| Com. Ex. 1 | 2 | +11 | 0.5 | +11 | 2 |
| Com. Ex. 2 | 2 | +11 | 0.5 | +5 | 2 |

| | Specification of Insert | | | |
|---|---|---|---|---|
| No. | Receding Portion | Angle-Changing Surface Portion in Corner Cutting Edge[5] | T1[6] (mm) | T2[7] (mm) |
| Example 1 | Yes | Yes (100%) | 4.3 | 7.1 |
| Example 2 | Yes | Yes (100%) | 4.3 | 7.1 |
| Com. Ex. 1 | Yes | No | 4.3 | 7.1 |
| Com. Ex. 2 | Yes | No | 4.3 | 7.1 |

Note:
[1]The clearance angle of a bottom cutting edge.
[2]The length of a bottom cutting edge (FIG. 3).
[3]The clearance angle of a peripheral cutting edge.
[4]The length of a peripheral cutting edge (FIG. 3).
Note:
[5]The percentage (%) of the length of the angle-changing surface portion to the entire length of the corner cutting edge.
[6]The distance between long sides of the insert (FIG. 3).
[7]The distance between short sides of the insert (FIG. 3).

TABLE 2

| | Specification of Cutting Tool | | | | | | |
|---|---|---|---|---|---|---|---|
| | Bottom Cutting Edge | | Peripheral Cutting Edge | | | Cutting | |
| No. | Radial Rake Angle (°) | Clearance Angle (°) | Radial Rake Angle (°) | Axial Rake Angle (°) | Clearance Angle (°) | Edge Diameter (mm) | Number of Inserts |
| Example 1 | −2 | +8 | +2.25* | +10 | +11 to +14 | 12 | 3 |
| Example 2 | −2 | +8 | +2.25* | +10 | +11 to +14 | 12 | 3 |
| Com. Ex. 1 | +1 | +8 | +2 | +10 | +20 | 12 | 3 |
| Com. Ex. 2 | −2 | +8 | +2 | +10 | +14 | 12 | 3 |

Note:
*Maximum value.

TABLE 3

| | Maximum Surface Roughness Rz (μm) of Cut Surface | | |
|---|---|---|---|
| No. | After 20 minutes | After 30 minutes | After 60 minutes |
| Example 1 | 2.38 | 2.65 | 3.45 |
| Example 2 | 2.83 | 2.58 | 3.63 |
| Com. Ex. 1 | 2.34 | 3.68 | 5.16 |
| Com. Ex. 2 | 2.80 | 2.63 | 3.71 |

The cutting test results revealed that in Examples 1 and 2, the cut work 19 had good finished surfaces in horizontal and vertical walls, with any of the bottom cutting edge 11, the corner cutting edge 12 and the peripheral cutting edge 13 normally worn without chipping and breakage. On the other hand, in Comparative Example 1, the cut horizontal and vertical walls had poor finished surface conditions, with chipping and breakage in the peripheral cutting edge 13.

The comparison of Example 2 with Comparative Example 1 revealed that the maximum surface roughness Rz of a plane-cut surface was 0.65 μm in Example 2, extremely smaller than 5.23 μm in Comparative Example 1. With respect to the cut surface condition, as shown in FIGS. 20 and 21, a finished surface of a work in Example 1 had little streaks such as scratches, etc. This appears to be due to the fact that the bottom cutting edge 11a having a radial rake angle of −2° in Example 2 could control chips to be discharged outward without damaging a finished surface of a work, while the bottom cutting edge 11a having a radial rake angle of +1° in Comparative Example 1 made chips less separable from the bottom cutting edge 11a, resulting in a deteriorated finished surface condition due to the biting of chips, etc.

As shown in Table 3, the maximum surface roughness Rz of a vertical wall of a work 19 after 60-minute cutting was as small as 3.45 μm and 3.63 μm in Examples 1 and 2, while it was as large as 5.16 μm in Comparative Example 1.

As shown in FIGS. 22 and 23, the evaluation of the damage of cutting edges used to cut a vertical wall revealed that the maximum wear width (Vbmax) after 60-minute cutting was as small as 0.036 mm in Example 2, meaning normal wear, resulting in a long life. Normal wear in Example 2 appears to be due to the fact that the strength of the cutting edge could be kept by making the clearance angle β of the peripheral cutting edge 13 as small as +5°.

In Comparative Example 1, on the other hand, chipping occurred in cutting edges after 60-minute cutting, making continuous use impossible. Chipping in Comparative Example 1 appears to be due to the fact that with the peripheral cutting edge 13 having as large a clearance angle β as +11°, the peripheral cutting edge 13 failed to keep strength to a high cutting load.

As described above, by providing the bottom cutting edge with a relatively large clearance angle to increase its wear resistance, by providing the peripheral cutting edge required to have high strength and breakage resistance for high-speed cutting with a relatively small clearance angle, and by providing the flank of the corner cutting edge connecting the bottom cutting edge having a large clearance angle and the peripheral cutting edge having a small clearance angle with an angle-changing surface portion having a continuously changing clearance angle along the corner cutting edge, high-speed cutting can be conducted with an excellent finished surface, while preventing chipping and breakage in the bottom cutting edge, the corner cutting edge and the peripheral cutting.

On the other hand, when the bottom cutting edge and the peripheral cutting edge have the same clearance angle as in the insert of Comparative Example 1, a desired clearance angle should be given to the tool by the seat surface shape of the tool holder. In an indexable rotary cutting tool having as small a cutting edge diameter as about 10 mm, however, it is extremely difficult to make a design that the bottom cutting edge and the peripheral cutting edge have desired clearance angles while securing strength to the seat surface. It has also been found that in the case of using the insert of Comparative Example 2 having no angle-changing surface portion having a continuously changing clearance angle in the flank of the corner cutting edge connecting the bottom cutting edge having a large clearance angle and the peripheral cutting edge having a small clearance angle, chipping and breakage are likely to occur in the corner cutting edges.

Effect of the Invention

Because the insert of the present invention comprises bottom cutting edges each having a relatively large clearance angle, peripheral cutting edges each having a relatively small clearance angle, and angle-changing surface portions each having a continuously changing clearance angle in a flank of each corner cutting edge connecting the bottom cutting edge having a large clearance angle and the peripheral cutting edge having a small clearance angle, the bottom cutting edge has high wear resistance, the peripheral cutting edge conducting high-speed cutting has high strength and breakage resistance, and the corner cutting edge subjected to a large load during cutting has remarkably improved breakage resistance. Accordingly, cutting with an indexable cutting tool having the inserts of the present invention can efficiently provide a high-accuracy finished surface with a long life, while preventing chipping and breakage in the bottom cutting edge, the corner cutting edge and the peripheral cutting edge.

DESCRIPTION OF REFERENCE NUMERALS

1: Indexable rotary cutting tool
2: Tool holder
3: Insert seat
4: Seat surface
5: Rear wall surface of insert seat coming into contact with short side surface of insert
6: Side wall surface of insert seat coming into contact with long side surface of insert
7: Insert
8: Upper surface of insert
8a: First upper surface region
8b: Second upper surface region (rake face)
9: Lower surface of insert
10: Side surface
10a, 10c: Long side surface (long side)
10b, 10d: Short side surface (short side)
11: Bottom cutting edge
21: Flank of bottom cutting edge
12: Corner cutting edge
13: Peripheral cutting edge
13a: Upper end of peripheral cutting edge
23: Flank of peripheral cutting edge
14: Center hole
15: Angle-changing surface portion
16: Receding portion
17: Threaded hole of tool holder
18: Clamp screw
19: Work
L1: Straight line connecting rotation axis O and outermost end of bottom cutting edge
L2: Straight line connecting rotation axis O and outermost end of peripheral cutting edge
M1: Straight line extending from bottom cutting edge
M2: Straight line extending from rake face of peripheral cutting edge
N: Straight line extending along long side of substantial parallelogram
O: Rotation axis
P: Center axis
R: Rotation direction of tool
Rc: Radius of corner cutting edge
Z: Position in rotation axis direction at which sign of radial rake angle changes
ε: Cutting edge angle

What is claimed is:

1. An indexable rotary cutting tool having inserts detachably attached to a tool holder,
  (a) said insert comprising an upper surface, a lower surface opposing said upper surface and coming into contact with a seat surface of said tool holder, side surfaces connecting said upper surface to said lower surface, a center hole penetrating said insert from said upper surface to said lower surface for receiving a fastening screw, and cutting edges formed along ridgelines of said upper surface and said side surfaces;
  said insert having in a polygonal shape and being rotationally symmetric around a center axis P of said center hole, with corner portions having angles of 90° or less;
  each of said cutting edges being constituted by a curved corner cutting edge formed in each corner portion, and a bottom cutting edge and a peripheral cutting edge formed along ridgelines on both sides of said corner cutting edge;
  a flank of said bottom cutting edge and a flank of said peripheral cutting edge having different clearance angles;
  a flank of said corner cutting edge having an angle-changing surface portion having a clearance angle continuously changing from a clearance angle of the flank of said bottom cutting edge to a clearance angle of the flank of said peripheral cutting edge; and
  a ridgeline of said upper surface extending from an upper end of said peripheral cutting edge being provided with a receding portion determining one end of said peripheral cutting edge; and
  (b) in a state where said inserts are attached to said tool holder,
  each of said bottom cutting edges and said corner cutting edges having a negative radial rake angle;
  each of said peripheral cutting edges having a radial rake angle changing from negative to positive; and
  the length of a region having a positive radial rake angle in said peripheral cutting edge being 50% or more of the entire length of said peripheral cutting edge.

2. The indexable rotary cutting tool according to claim 1, wherein the clearance angle of the flank of said bottom cutting edge is larger than that of the flank of said peripheral cutting edge in said insert.

3. The indexable rotary cutting tool according to claim 2, wherein the clearance angle a of the flank of said bottom cutting edge is 6-12°, and the clearance angle β of the flank of said peripheral cutting edge is 3-11°, said clearance angle a being larger than said clearance angle β by 2° or more.

4. The indexable rotary cutting tool according to claim 1, wherein said bottom cutting edge, said corner cutting edge and said peripheral cutting edge are connected to a flat rake face.

5. The indexable rotary cutting tool according to claim 1, wherein the length of said angle-changing surface portion along said corner cutting edge is at least 80% of the entire length of said corner cutting edge.

6. The indexable rotary cutting tool according to claim 4, wherein said upper surface comprises a first upper surface region having said center hole, and second upper surface regions each constituting said rake face, each rake face being lower than said first upper surface region, and downward inclined toward said first upper surface region with said corner cutting edge as an apex.

7. The indexable rotary cutting tool according to claim 1, wherein a cutting edge angle ε in each corner portion is 80-90°.

8. The indexable rotary cutting tool according to claim 1, wherein said insert has a substantially parallelogrammic or equilateral-triangular shape.

9. The indexable rotary cutting tool according to claim 8, wherein said insert has a substantially parallelogrammic shape having a pair of parallel long sides and a pair of parallel short sides; the distance T1 between the long sides being 4-6 mm, and the distance T2 between the short sides being 6-10 mm.

10. The indexable rotary cutting tool according to claim 9, wherein to the distance T1 between said long sides, the percentage of the length T3 of said bottom cutting edge is 10-40%, the percentage of the length T4 of said peripheral cutting edge is 25-50%, and the percentage of the radius Rc of said corner cutting edge is 4-25%.

11. The indexable rotary cutting tool according to claim 8, wherein said insert has a substantially equilateral-triangular shape; the perpendicular distance T5 between one peripheral cutting edge and a corner cutting edge farthest therefrom being 5-8 mm.

12. The indexable rotary cutting tool according to claim 11, wherein to said perpendicular distance T5, the percentage of the length T6 of said bottom cutting edge is 10-35%, the percentage of the length T7 of said peripheral cutting edge is 15-40%, and the percentage of the radius Rc of said corner cutting edge is 2.5-20%.

13. The indexable rotary cutting tool according to claim 1, wherein said insert fixed to said tool holder has said bottom cutting edges each having a radial rake angle of −3° to −0.5°, and said peripheral cutting edges each having a radial rake angle of −0.5° to +3°.

14. The indexable rotary cutting tool according to claim 1, wherein said radial rake angle linearly changes in a region from an inner end of said corner cutting edge to the upper end of said peripheral cutting edge.

15. The indexable rotary cutting tool according to claim 1, wherein in said inserts fixed to said tool holder, each bottom cutting edge has the flank having a clearance angle in a range of 5-10°, and each peripheral cutting edge has the flank having a clearance angle in a range of 10-18°.

* * * * *